United States Patent
Chen et al.

(10) Patent No.: US 7,403,574 B2
(45) Date of Patent: Jul. 22, 2008

(54) SIMPLIFIED SCRAMBLING SCHEME FOR SATELLITE BROADCASTING SYSTEMS

(75) Inventors: Ernest C. Chen, San Pedro, CA (US);
Dennis Lai, Cerritos, CA (US);
Tung-Sheng Lin, Alhambra, CA (US);
William C. Lindsey, Pasadena, CA (US); Shamik Maitra, Redondo Beach, CA (US); Joseph Santoru, Agoura Hills, CA (US); Guangcai Zhou, Reseda, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 121 days.

(21) Appl. No.: 10/568,384

(22) PCT Filed: Aug. 27, 2004

(86) PCT No.: PCT/US2004/027981

§ 371 (c)(1),
(2), (4) Date: Feb. 14, 2006

(87) PCT Pub. No.: WO2005/022758

PCT Pub. Date: Mar. 10, 2005

(65) Prior Publication Data

US 2006/0215785 A1    Sep. 28, 2006

Related U.S. Application Data

(60) Provisional application No. 60/498,824, filed on Aug. 29, 2003.

(51) Int. Cl.
*H03C 3/00* (2006.01)

(52) U.S. Cl. .................................. 375/302; 380/268

(58) Field of Classification Search ................. 375/302; 380/267, 261, 268
See application file for complete search history.

(56) References Cited

U.S. PATENT DOCUMENTS

| 5,144,669 | A * | 9/1992 | Faulkner et al. ............. 380/212 |
| 6,952,480 | B1 * | 10/2005 | Martin ....................... 380/261 |
| 2003/0099357 | A1 * | 5/2003 | Ryu et al. ................... 380/252 |
| 2004/0095904 | A1 * | 5/2004 | Laroia et al. ................ 370/329 |

OTHER PUBLICATIONS

Australian examination report in Australian counterpart application No. 2004302831 dated Dec. 6, 2007.
Written Opinion of the International Searching Authority dated Aug. 24, 2005 in counterpart International application PCT/US04/27981.
Australian Examination report dated Feb. 16, 2007 in counterpart Australian patent application 2004302831.
Australian Examination report dated Oct. 19, 2007 in counterpart Australian patent application 2004302831.

* cited by examiner

*Primary Examiner*—Temesghen Ghebretinsae (57) ABSTRACT

A simplified scrambling scheme that unifies all signals of a satellite broadcasting system, including frame header (404), frame body (402) and pilot symbols (408) with a common reference phase. This results in the simplification and increased flexibility of the receiver front-end design without affecting the overall system performance. In many current communications systems with frame headers and pilot symbols, the phases of frame headers and pilot syrnbols are not designed to be aligned with any constellation points of the modulated data from the frame body. This scrambling scheme takes into account possible impact due to irregular phase changes between frame headers/pilot symbols and modulated data.

10 Claims, 8 Drawing Sheets

SIMPLIFIED SCRAMBLING SCHEME FOR SATELLITE BROADCASTING SYSTEMS

CROSS-REFERENCE TO RELATED APPLICATIONS

This application claims the benefit under 35 U.S.C. §119(e) of U.S. Provisional Patent Application No. 60/498,824, filed Aug. 29, 2003, by Ernest C. Chen, Dennis Lai, Tung-Sheng Lin, William C. Lindsey, Shamik Maitra, Joseph Santoru and Guangcai Zhou, entitled "SIMPLIFIED SCRAMBLING SCHEME FOR SATELLITE BROADCASTING SYSTEMS," which application is incorporated by reference herein.

BACKGROUND OF THE INVENTION

1. Field of the Invention

The present invention relates generally to methods and systems for scrambling transmitted information, and more specifically, to a simplified scrambling scheme that unifies all signals with a common reference phase.

2. Description of the Related Art

Digital Direct Broadcast Systems (DBS), such as DIRECTV®, which is provided by the assignee of the present invention, have become very successful. However, as such systems evolve, there is an increasing demand for additional bandwidth to carry an ever-increasing set of audio, video and data services.

In satellite television, there is a constant need for additional throughput to adequately accommodate the ever-increasing demands with respect to the video and data services which they provide. With respect to developing their next generation systems, more efficient forward error correction (FEC) codes such as low-density parity check (LDPC) codes, turbo codes, etc., are under investigation in order to achieve the aforementioned goal. To use these highly efficient FEC codes, a frame header is pre-inserted to modulated data to ensure that the boundaries of code frames can be easily identified by the decoder. Also, since these codes are often operated over channels with very low carrier-to-noise ratio (CNR) and in the presence of low noise block (LNB) and other phase noise, pilot symbols are inserted periodically to improve the performance of carrier synchronization.

Header and pilot symbols are essential in the next generation of satellite television broadcasting systems to ensure the quality of timing acquisition and frame synchronization as well as carrier (including frequency and phase) acquisition and tracking. There is a need to improve demodulation performance of systems with header/pilot symbols. The present invention satisfies this need.

SUMMARY OF THE INVENTION

To address the requirements described above, the present invention discloses a method and apparatus for scrambling symbols in a data transmission system, comprising scrambling all elements of a frame (frame header, frame body and one or more pilot symbols) prior to transmission of the frame by the system, so that all of the elements have a common reference phase. The present invention results in simplification and increased flexibility of the receiver front-end design without affecting the overall system performance. In many current communications systems with frame header/pilot symbols, the phases of header/pilot symbols are not designed to be aligned with any constellation points. This scheme is novel from the viewpoint of signal design: it takes into account possible impacts due to irregular phase changes between header/pilot symbols and modulated data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes a simplified scrambling scheme that unifies all signals in a data transmission system, such as a direct broadcast satellite system, including frame header, frame body, and pilot symbols, with a common reference phase. This results in the simplification and increased flexibility of the receiver front-end design without affecting the overall system performance.

In many current communications systems with frame headers and pilot symbols, the phases of the frame headers and pilot symbols are not designed to be aligned with any constellation points for modulated data (i.e., the frame body). The scheme of the present invention is novel from the viewpoint of signal design: it takes into account possible impacts due to irregular phase changes between the frame headers/pilot symbols and modulated data.

The present invention provides a simple scrambling scheme that results in the following advantages over that proposed by the DVB-S2 (Digital Video Broadcasting—Satellite Version 2) standards group:

Eliminates unnecessary phase jumps between frame header/pilot symbols and modulated data: the spectral properties of modulated data are preserved.

Requires less signal processing: Only I/Q (in-phase and quadrature) component swapping and sign changes are needed and re-scaling is not required.

Reduces the implementation complexity of the receiver: frame headers/pilot symbols can be treated as modulated data; i.e., no special treatment is required for frame headers/pilot symbols.

Allows more choices with respect to acquisition/tracking algorithms: no performance degradation is experienced with respect to the acquisition/tracking algorithms based on averaging or $N^{th}$ power nonlinear operation.

Direct Broadcast Satellite System

Figure 1:
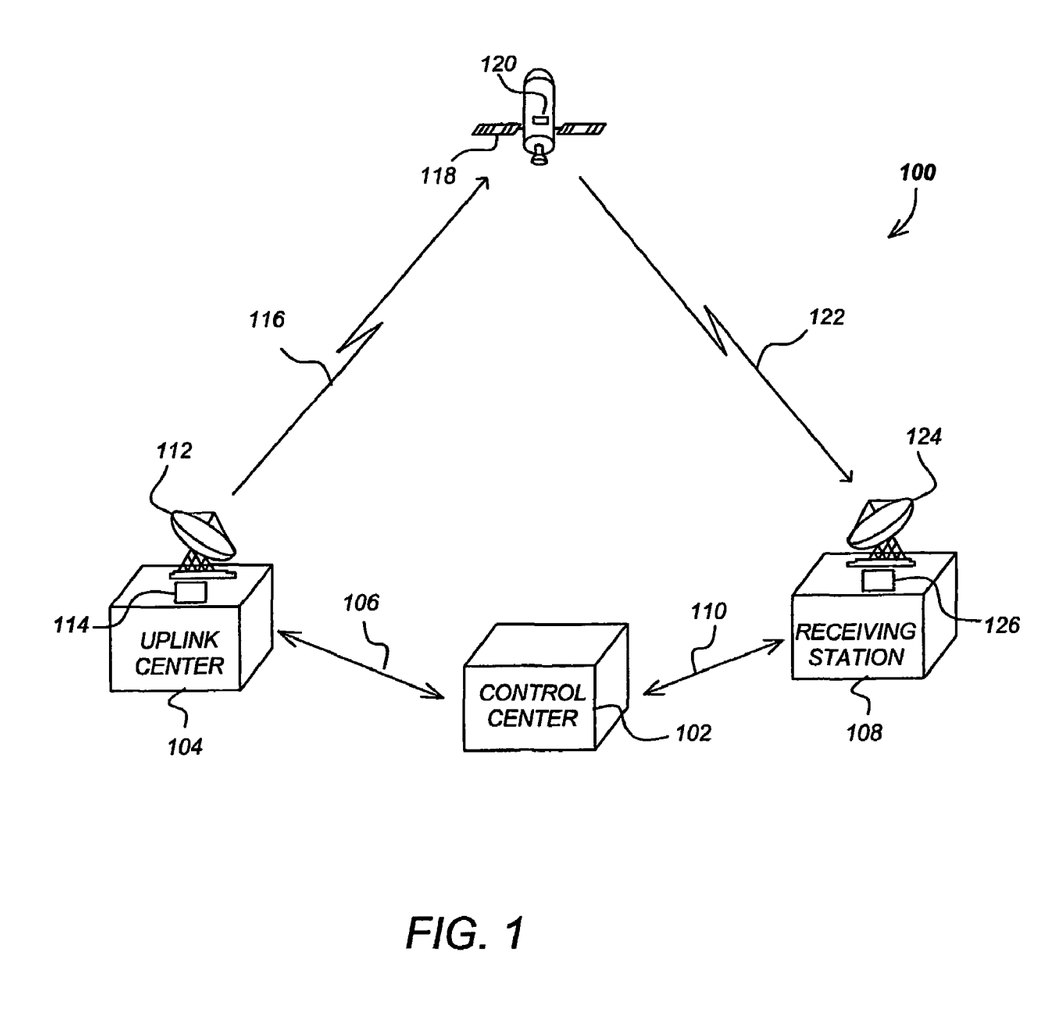
FIG. 1 is a diagram illustrating an exemplary direct broadcast satellite system according to a preferred embodiment of the present invention.

FIG. 1 is a diagram illustrating an exemplary direct broadcast satellite system 100 according to a preferred embodiment of the present invention. The system 100 includes a control center 102 operated by a service provider in communication with an uplink center 104 via a link 106 and with receiving stations 108 via a link 110. The control center 102 provides broadcast materials to the uplink center 104 and coordinates with the receiving stations 108 to offer various services, including key management for encryption and decryption, etc.

The uplink center 104 receives the broadcast materials from the control center 102 and, using an antenna 112 and transmitter 114, transmits the broadcast materials via uplink 116 to one or more satellites 118, each of which may include one or more transponders 120. The satellites 118 receive and process the broadcast materials and re-transmit the broadcast materials to receiving stations 108 via a downlink 122, using transponders 120. Receiving stations 108 receive the broadcast materials from the satellites 118 via an antenna 124, and decode and decrypt the broadcast materials using a receiver 126.

Signal Transmission

Figure 2:
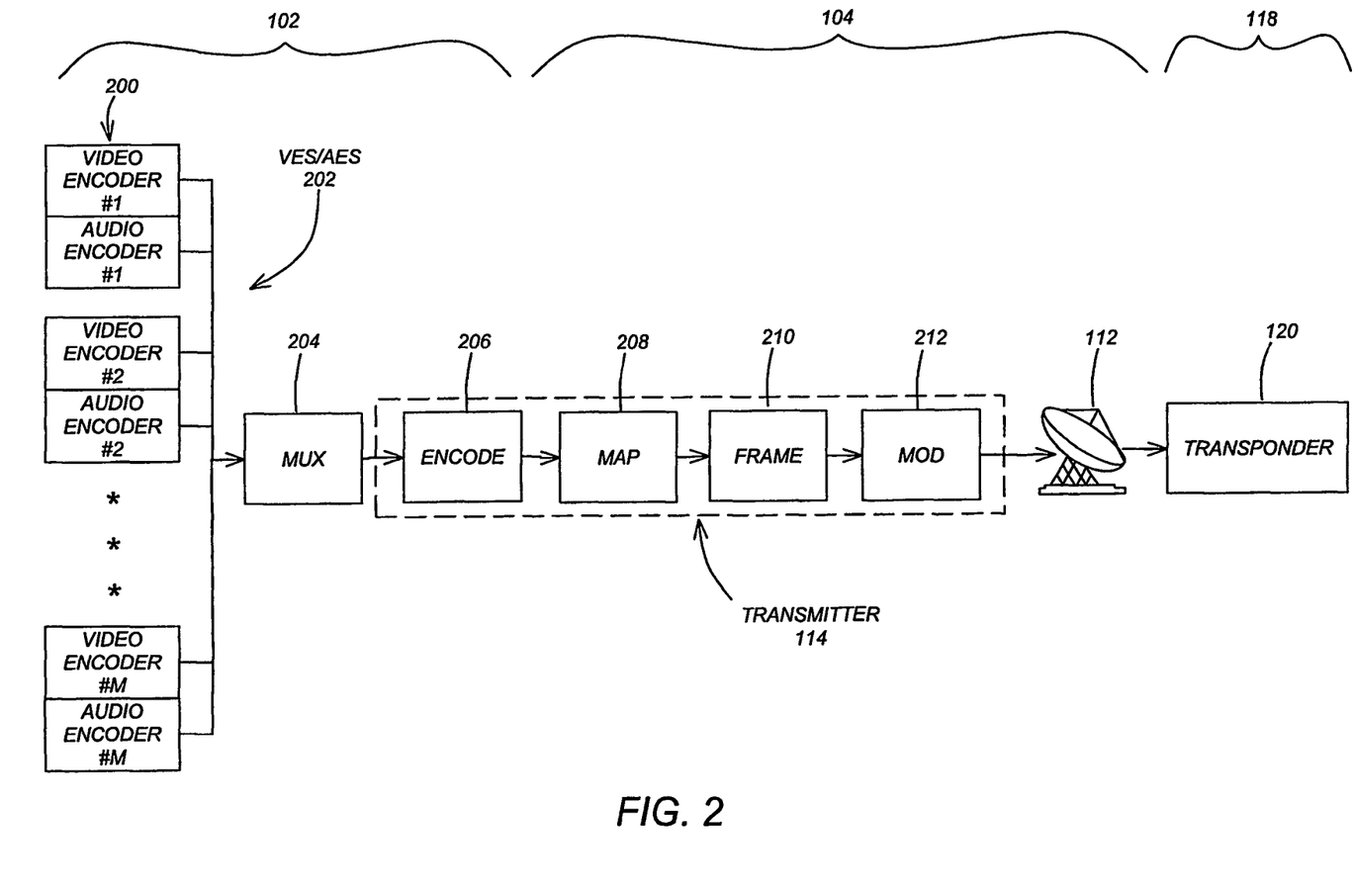
FIG. 2 is a block diagram that further illustrates an exemplary signal transmission system according to the preferred embodiment of the present invention.

FIG. 2 is a block diagram that further illustrates an exemplary signal transmission system according to the preferred embodiment of the present invention. The control center 102 includes a plurality of video and/or audio encoders 200 that each encode a video and/or audio source into a video elementary stream (VES) and/or audio elementary stream (AES) 202. The resulting video and/or audio elementary streams 202 are statistically multiplexed at 204. The multiplexed data stream is encoded using a forward error correcting (FEC) code at 206. After FEC encoding, a number of transmitter 114 functions are performed. The encoded data stream is mapped into the desired constellation, i.e., BPSK (binary phase shift keying), QPSK (quadrature phase shift keying), 8PSK (8 phase shift keying), 16APSK (16 amplitude phase shift keying), or 32APSK (32 amplitude phase shift keying), at 208, and physical layer (PL) framing is performed at 210, wherein the PL framing includes the addition of a frame header, the optional insertion of pilot symbols, and the scrambling or randomization of the frame body. The data stream of PL frames is modulated and converted to uplink frequency at 212, and then uplinked via antenna 112 to one or more transponders 120 in one or more satellites 118.

Signal Reception

Figure 3:
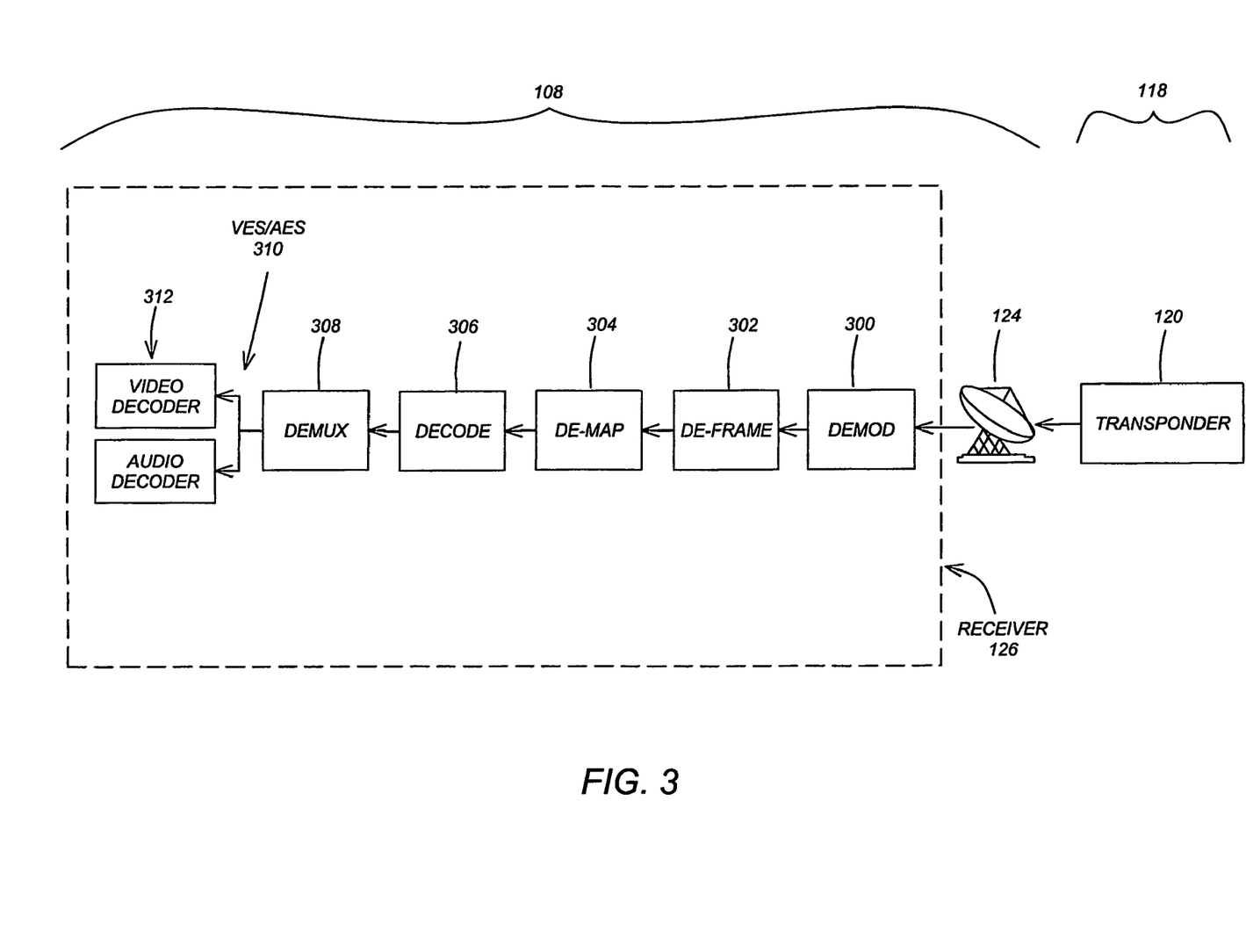
FIG. 3 is a block diagram that further illustrates an exemplary signal reception system according to the preferred embodiment of the present invention.

FIG. 3 is a block diagram that further illustrates an exemplary signal reception system according to the preferred embodiment of the present invention. At the receiving stations 108, the data stream of PL frames is downlinked from the transponders 120 in the satellites 118 via antenna 124 and receiver 126. In the receiver 126, the signal stream is frequency down-converted and the data stream is demodulated at 300. After demodulation, PL de-framing is performed on the data stream at 302, which includes de-scrambling, and synchronization to and removal of the frame header and optional pilot symbols to recover the frame body. The data stream is de-mapped at 304 to recover the FEC encoded data stream. The FEC encoded data stream is decoded at 306. The resulting data stream is statistically demultiplexed at 308 to recover the video and/or audio elementary streams 310. The video and/or audio elementary streams 310 are decoded by video and/or audio decoders 312, respectively, to complete the signal reception.

Physical Layer Frame

Figure 4:
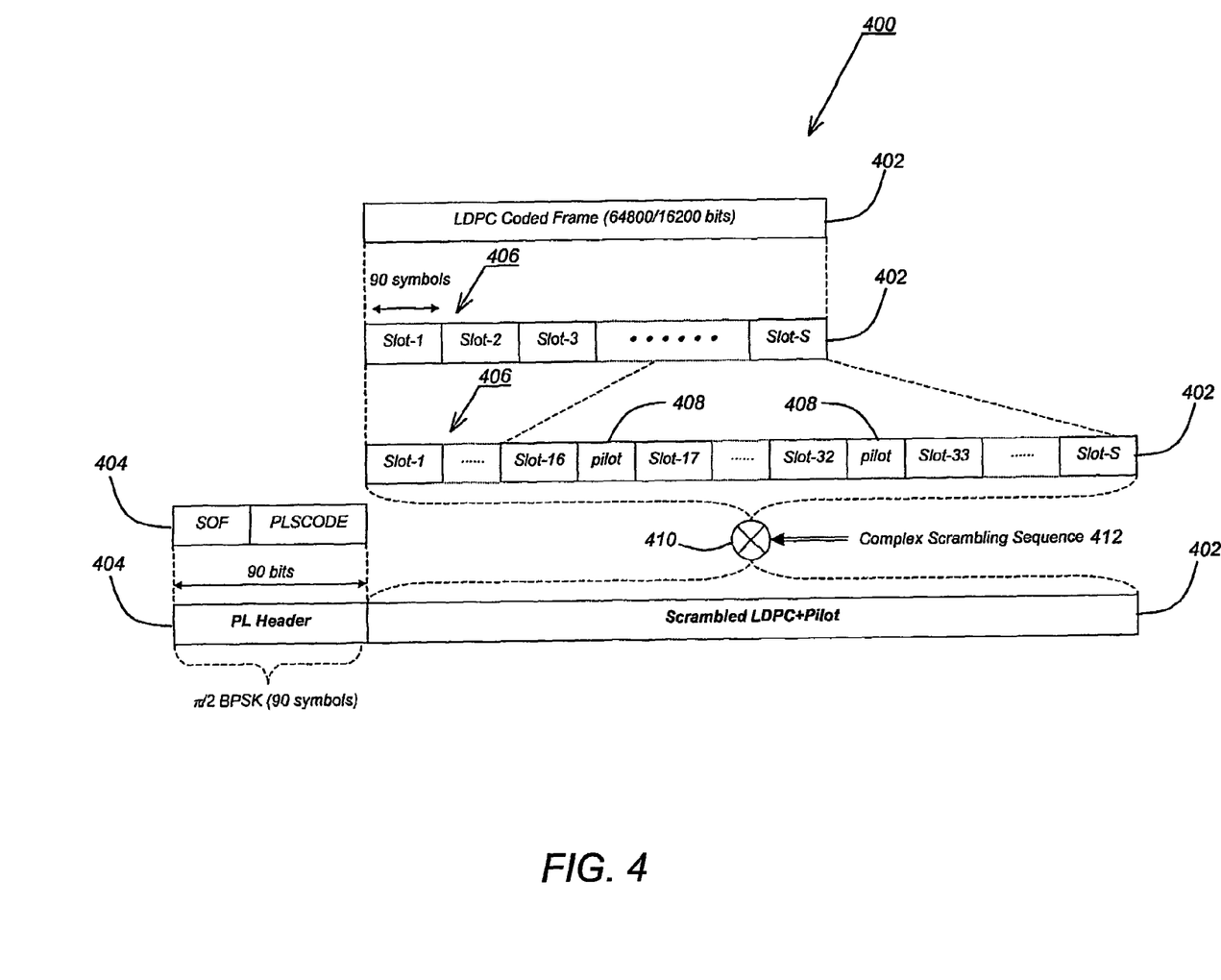
FIG. 4 is a schematic that illustrates the format of the physical layer (PL) frame.

FIG. 4 is a schematic that illustrates the format of the physical layer (PL) frame 400. Every PL Frame 400 is comprised of:

a PL Body 402, comprised of a payload of 64,800 bits (long FEC frame) or 16,200 bits (short FEC frame), generated by encoding the user bits according to the selected FEC scheme; and a PL Header 404, containing a synchronization sequence, type of modulation and FEC rate, frame length, and presence/absence of pilot symbols.

The PL Body 402 is comprised of S slots 406, wherein each slot is comprised of 90 symbols. The number S of slots 406 varies depending on the modulation, wherein S=720 for BPSK, S=360 for QPSK, S=240 for 8PSK, S=180 for 16APSK and S=90 for 32APSK. Pilot symbols 408 may be inserted every 16 slots to maintain synchronization, wherein the Pilot symbols 408 comprise 36 symbols.

The PL Header 404 is comprised of 90 symbols with a fixed π/2 BPSK modulation. The first 26 symbols in the PL Header 404 allow detection of Start Of Frame (SOF). The next 64 symbols comprise a Physical Layer Signalling Code (PLSCODE), suitable for soft-decision correlation decoding and containing the signaling information listed above.

In the original DVB-S2 signal phasing structure, each PL Header 404 is modulated using π/2 BPSK (0°, 180°, and ±90°). Each PL Body 402 is randomized for energy dispersal by performing a complex scrambling operation at 410 by multiplying (I+jQ) samples of the PL Body 402 by a complex scrambling (randomization) sequence 412, represented by $(C_I+jC_Q)$.

Original DVB-S2 Complex Scrambling Operation

In the original DVB-S2 signal phasing structure, the complex scrambling operation performed on the PL Body 402 comprises the following:

$$I_{S,k} + jQ_{S,k} = \left[\frac{1}{\sqrt{2}}\right](I_k + jQ_k) \cdot (C_{I,k} + C_{Q,k})$$

wherein:

$I_k, Q_k$ represent original symbols, $I_{S,k}, Q_{S,k}$ represent scrambled symbols, and $C_{I,k}, C_{Q,k}$ represent the complex scrambling sequence 412 with values ±1.

Figure 5:
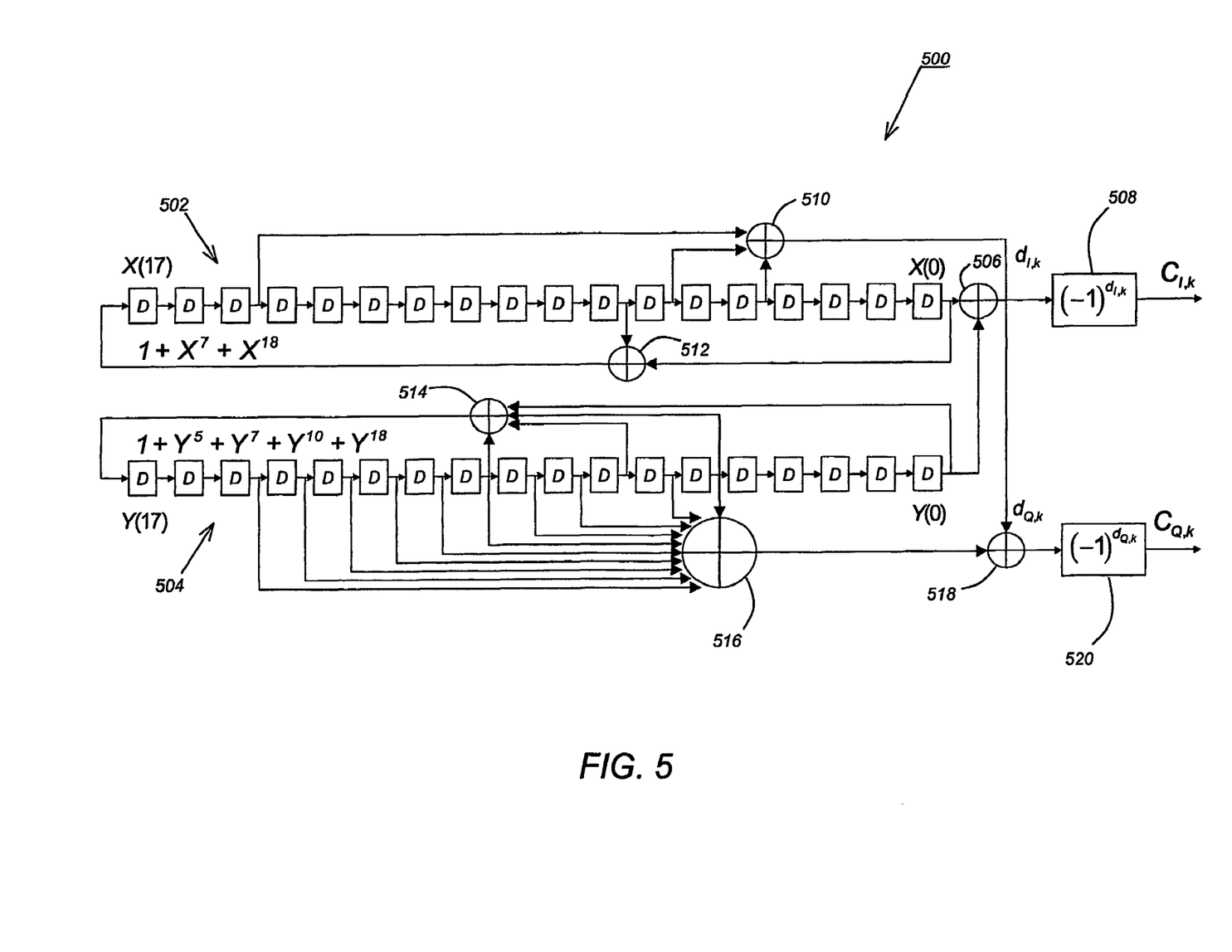
FIG. 5 is a block diagram indicating a Complex Scrambling Sequence Generation circuit according to a preferred embodiment of the present invention.

The complex scrambling sequence 412 is derived from:

$$C_{I,k} = (-1)^{d_{I,k}}$$

$$C_{Q,k} = (-1)^{d_{Q,k}}$$

wherein $d_{I,k}$ and $d_{Q,k}$ are real (I) and imaginary (Q) components of a $k^{th}$ element of the complex squaring sequence 412 generated by a Complex Scrambling Sequence Generation circuit 500 shown in FIG. 5 and described in more detail below.

Note that the complex scrambling operation 410 comprises simple additions and subtractions excluding the $1/\sqrt{2}$ factor, according to the following table:

| $C_{I,k}$ | $C_{Q,k}$ | $I_{S,k} + jQ_{S,k}$ |
|---|---|---|
| 1 | 1 | $(I_k - Q_k) + j(I_k + Q_k)$ |
| 1 | -1 | $(I_k - Q_k) + j(-I_k + Q_k)$ |
| -1 | 1 | $(-I_k - Q_k) + j(I_k - Q_k)$ |
| -1 | -1 | $(-I_k + Q_k) + j(-I_k - Q_k)$ |

After applying the above rule, the resulting signal phasing structure is as follows:

PL Header 404 modulated with π/2 BPSK (0°, 180°, and ±90°),

Modulated data (i.e., PL Body 402) scrambled with rotations of ±45° or ±135°:

BPSK is rotated to diagonal axes (±45° and ±135°),

QPSK is rotated to the I and Q axes (0°, ±90°, ±180°),

16APSK and 32APSK are rotated with node concentration on I and Q axes, and the 8PSK constellation is unchanged.

Figure 6:
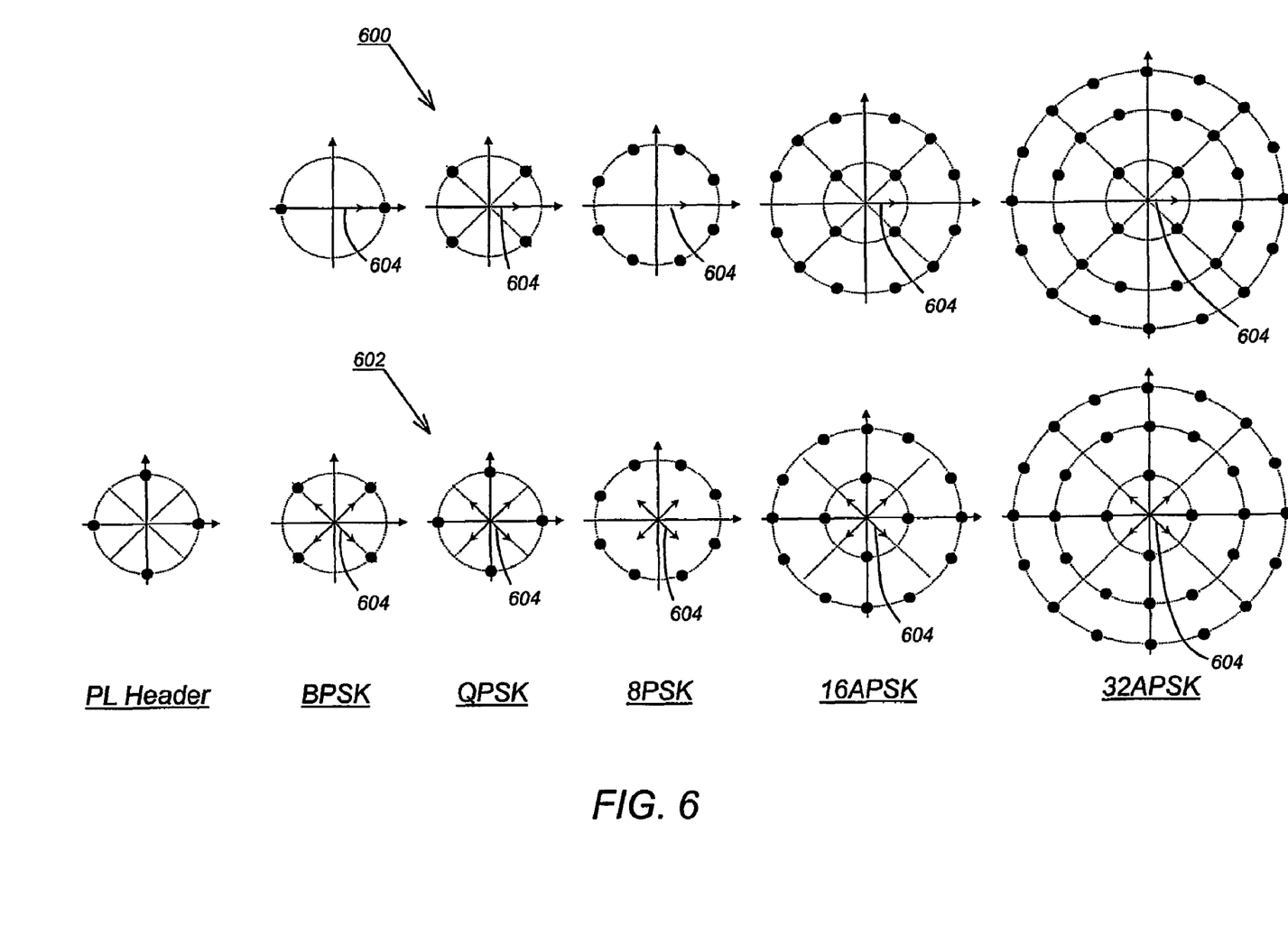
FIG. 6 shows the constellations of scrambled signals with $\{\pm 45°, \pm 135°\}$ rotations according to a preferred embodiment of the present invention.

The original signal constellations for several modulations are shown in FIG. 6, which is described in more detail below. The upper and lower rows represent the constellations before and after scrambling by the above rule, respectively. The dots represent constellation nodes, and the arrows represent pilot symbol phases. The PL Header 404 nodes are not affected by the scrambling. It can be seen that the phases of PL Header 404 and Pilot symbols 408 are not always aligned with those of the signal constellations for the modulated data, i.e., the PL Body 402. Specifically, the phase of the Pilot symbols 408 is 0° before scrambling, but is misaligned with respect to QPSK, 8PSK and 16APSK constellations after scrambling. Hence, phase jumps between a PL header 404/Pilot symbols 408 and the PL Body 402 can be readily observed in the constellations.

The present invention, on the other hand, unifies all signals with a common reference phase by means of an improved complex scrambling operation.

Improved Complex Scrambling Operation

The present invention is intended to make the phases of the PL Header 402 and Pilot symbols 408 align with some points of constellations of the PL Body 402 as modulated. This can be accomplished by performing an improved complex scrambling operation 410 on PL Body 402 and Pilot symbols 408:

$$I_{S,k} + jQ_{S,k} = (I_k + jQ_k) \cdot \exp\left\{j\frac{2\pi n_k}{4}\right\}$$

wherein:

$I_k, Q_k$ represents original symbols, $I_{S,k}, Q_{S,k}$ represents scrambled symbols, $n_k$ represents a scrambling phase multiplier, such that $n_k = 2d_{I,k} + d_{Q,k}$, and $d_{I,k}$ and $d_{Q,k}$ are real (I) and imaginary (Q) components of a $k^{th}$ element of the complex scrambling sequence 412 generated by the circuit 500.

In this complex scrambling operation 410, only I/Q component swapping and sign changing are performed, which is described in the following table:

| $d_{I,k}$ | $d_{Q,k}$ | $n_k$ | Rotation | $I_{S,k} + jQ_{S,k}$ |
|---|---|---|---|---|
| 0 | 0 | 0 | 0° | $I_k + jQ_k$ |
| 0 | 1 | 1 | 90° | $-Q_k + jI_k$ |
| 1 | 0 | 2 | 180° | $-I_k - jQ_k$ |
| 1 | 1 | 3 | 270° | $Q_k - jI_k$ |

Note that rescaling is not required.

According to the present invention, the resulting signal phasing for example modulations is summarized as follows:

BPSK payload symbol phases={45°, -135°}

Scrambled symbol phases={±45°, ±135°}

8PSK payload symbol phases={0°, ±90°, 180°, ±45°, ±135°}

Scrambled symbol phases={0°, ±90°, 180°±45°, ±135°} (same set)

PL Header 402 symbol phases={45°, 135°} (same as BPSK)

π/2-Modulated data phases={±45°, ±135°}

Pilot symbol 408 phases={45°}

Scrambled symbol phases={±45°, ±135°}

All signals have a common phase of 45° with respect to BPSK, QPSK, 8PSK, 16APSK and 32APSK modulations, before as well as after the complex scrambling operation 410 is performed.

Figure 7:
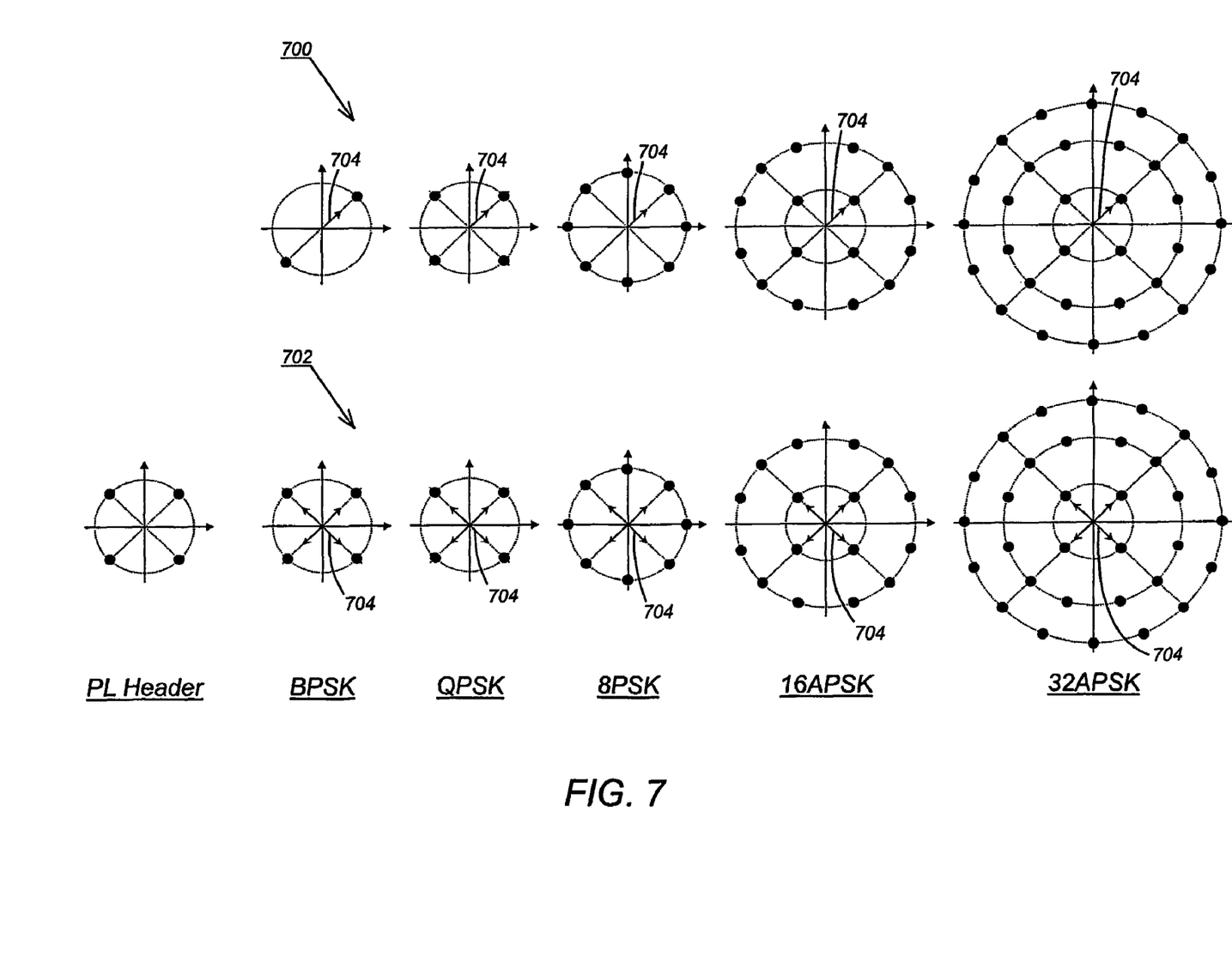
FIG. 7 shows the constellations of scrambled signals with $\{0°, \pm 90°, 180°\}$ rotations according to a preferred embodiment of the present invention.

The constellations of various modulations from the present invention are shown in FIG. 7, which is described in more detail below. Note that there is no unnecessary phase jump between the PL Header 404 and Pilot symbols 408, and the modulated data, i.e., PL Body 402, in the present invention.

Complex Scrambling Sequence Generation Circuit

FIG. 5 is a block diagram indicating a Complex Scrambling Sequence Generation circuit 500 used in the preferred embodiment of the present invention. Generally, the functions of the Complex Scrambling Sequence Generation circuit 500 would be performed in the framing block 210 of the transmitter 114 and the de-framing block 302 of the receiver 126.

Within the circuit 500, two sequences of 1-bit delays (labeled as "D") are provided: a first sequence of X delays 502 (labeled left to right as X(17) to X(0)) and a second sequence of Y delays 504 (labeled left to right as Y(17) to Y(0)).

A initial string of bits or conditions are loaded into the first and sequence of delays 502 and 504, wherein the initial string of bits or conditions comprise:

$X(0)=1, X(1)=X(2)=\ldots=X(17)=0$ $Y(0)=Y(1)=Y(2)=\ldots=Y(17)=1$

Thereafter, the PL Body 402 is loaded bitwise into the Complex Scrambling Sequence Generation circuit 500 at delay X(0), wherein the bits in each of the delays are loaded into the next adjacent delay upon each clock, so that:

$X(0)=X(1)=X(2)=\ldots=X(17)$ $Y(0)=Y(1)=Y(2)=\ldots=Y(17)$

In addition, a number of other operations are performed using various outputs of the delays. For example, an exclusive OR (XOR) 506 generates an output value of:

$d_{I,k}=X(0)+Y(0)$

This output value is then used at 508 to generate an output value for the circuit 500 according to the following:

$C_{I,k}=(-1)^{d_{I,k}}$

An XOR 510 generates an output value of:

X(4)+X(6)+X(14)

An XOR 512 generates an output value that is used as the input to X(17):

X(17)=X(0)+X(7)

An XOR 514 generates an output value that is used to set the value of Y(17):

Y(17)=Y(0)+Y(5)+Y(7)+Y(10)

An XOR 516 generates an output value of:

Y(5)+Y(6)+Y(8)+Y(9)+Y(10)+Y(11)+Y(12)+Y(13)+Y(14)+Y(15)

An XOR 518 generates an output value of:

$d_{Q,k}=XOR_{516}+d_{I,k}$

This output value is then used at 520 to generate an output value for the circuit 500:

$C_{Q,k}=(-1)^{d_{Q,k}}$

Constellations of Scrambled Signals Using DVB-S2 Scrambling

FIG. 6 shows the constellations of signals using the existent DVB-S2 scrambling scheme. The upper level constellations 600 indicate the signals before scrambling for each of the different modulations, while the lower level constellations 602 indicate the signals after scrambling for the PL Header 404 as well as for each of the different modulations. The arrows 604 identify the rotations of the Pilot symbols 408.

Constellations of Scrambled Signals Using Improved Scrambling

FIG. 7 shows the constellations of signals using the improved scrambling scheme of the present invention. The upper level constellations 700 indicate the signals before scrambling for each of the different modulations, while the lower level constellations 702 indicate the signals after scrambling for the PL Header 404 as well as for each of the different modulations. The arrows 704 identify the rotations of the Pilot symbols 408.

Logic of the Preferred Embodiment

Figure 8:
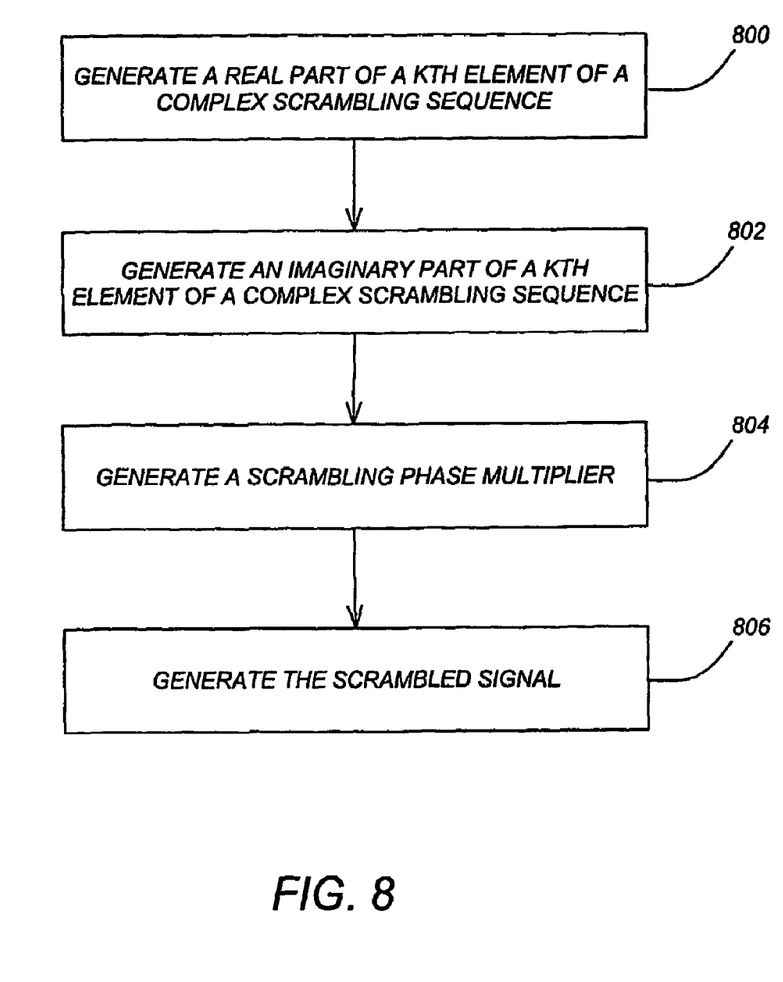
FIG. 8 is a flowchart that illustrates the logic performed in the preferred embodiment of the present invention.

FIG. 8 is a flowchart that illustrates the logic performed in the preferred embodiment of the present invention. Specifically, the logic comprises a method of generating a scrambled signal having real symbols $I_{S,k}$ and imaginary signals $Q_{S,k}$ from a signal having real symbols $I_k$ and imaginary symbols $Q_k$.

Block 800 represents the step of generating a real part of a $k^{th}$ element of a complex scrambling sequence ($d_{I,k}$).

Block 804 represents the step of generating a scrambling phase multiplier $n_k$ according to:

$n_k=2d_{I,k}+d_{Q,k}$.

Block 806 represents the step of generating the scrambled signal:

$$I_{S,k}+jQ_{S,k}=(I_k+jQ_k)e^{j\left(\frac{2\pi n_k}{4}\right)}.$$

Performance

The present invention provides performance at a level that is no less than that seen in the original DVB-S2 scheme in terms of carrier and phase acquisition as well as carrier and phase tracking. In fact, the present invention provides distinct advantages over the original DVB-S2 scheme in that it eliminates unnecessary phase jumps of π/4 and π/8 between the PL Header 404 and PL Body 402, between the Pilot symbols 408 and PL Body 402, and between nodes from different modulations, i.e., different PL Bodies 402. Such phase jumps may be undesirable in terms of performance as they may impact $N^{th}$ power processing performance, etc. Furthermore, the present invention requires less processing as only I/Q component swapping and sign changes are needed and rescaling is not required. Finally, the present invention simplifies the DVB-S2 specification as it reduces design and implementation complexity and associated testing and reduces cost for both the transmitter and the receiver.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of generating a scrambled signal having real symbols $I_{S,k}$ and imaginary signals $Q_{S,k}$ from a signal having real symbols $I_k$ and imaginary symbols $Q_k$, comprising the steps of:

generating a real part of a $k^{th}$ element of a complex scrambling sequence ($d_{I,k}$);

generating an imaginary part of the $k^{th}$ element of the complex scrambling sequence ($d_{Q,k}$);

generating a scrambling phase multiplier $n_k$ according to:

$n_k=2d_{I,k}+d_{Q,k}$; and generating the scrambled signal:

$$I_{S,k}+jQ_{S,k}=(I_k+jQ_k)e^{j\left(\frac{2\pi n_k}{4}\right)}.$$

2. A method of scrambling symbols in a data transmission system, comprising:

scrambling all elements of a frame prior to transmission of the frame by the system so that all of the elements have a common reference phase;

wherein the scrambling step comprises performing a complex scrambling operation according to:

$$I_{S,k}+jQ_{S,k}=(I_k+jQ_k)\cdot\exp\left\{j\frac{2\pi n_k}{4}\right\}$$

wherein:

$I_k$, $Q_k$ represents original symbols, $I_{S,k}$, $Q_{S,k}$ represents scrambled symbols, $n_k$ represents a scrambling phase multiplier, such that $n_k=2d_{I,k}+d_{Q,k}$, and $d_{I,k}$ and $d_{Q,k}$ are real (I) and imaginary (Q) components of a $k^{th}$ element of the complex scrambling sequence.

3. The method of claim 2, wherein the elements of the frame comprise a frame header or frame body.

4. The method of claim 2, wherein the elements of the frame further comprise one or more pilot symbols.

5. The method of claim 2, wherein the complex scrambling operation comprises simple component swapping and sign changing according to:

| $d_{I,k}$ | $d_{Q,k}$ | $n_k$ | Rotation | $I_{S,k} + jQ_{S,k}$ |
|---|---|---|---|---|
| 0 | 0 | 0 | 0° | $I_k + jQ_k$ |
| 0 | 1 | 1 | 90° | $-Q_k + jI_k$ |
| 1 | 0 | 2 | 180° | $-I_k - jQ_k$ |
| 1 | 1 | 3 | 270° | $Q_k - jI_k$ |

6. An apparatus for scrambling symbols in a data transmission system, comprising:
means for scrambling all elements of a frame prior to transmission of the frame by the system so that all of the elements have a common reference phase, the means for scrambling comprising means for performing a complex scrambling operation according to:

$$I_{S,k} + jQ_{S,k} = (I_k + jQ_k) \cdot \exp\left\{j\frac{2\pi n_k}{4}\right\}$$

wherein:
$I_k$, $Q_k$ represents original symbols,
$I_{S,k}$, $Q_{S,k}$ represents scrambled symbols,
$n_k$ represents a scrambling phase multiplier, such that $n_k = 2d_{I,k} + d_{Q,k}$, and
$d_{I,k}$ and $d_{Q,k}$ are real (I) and imaginary (Q) components of a $k^{th}$ element of the complex scrambling sequence.

7. The apparatus of claim 6, wherein the elements of the frame comprise a frame header or frame body.

8. The apparatus of claim 6, wherein the elements of the frame further comprise one or more pilot symbols.

9. The apparatus of claim 6, wherein the complex scrambling operation comprises simple additions and subtractions according to:

| $d_{I,k}$ | $d_{Q,k}$ | $n_k$ | Rotation | $I_{S,k} + jQ_{S,k}$ |
|---|---|---|---|---|
| 0 | 0 | 0 | 0° | $I_k + jQ_k$ |
| 0 | 1 | 1 | 90° | $-Q_k + jI_k$ |
| 1 | 0 | 2 | 180° | $-I_k - jQ_k$ |
| 1 | 1 | 3 | 270° | $Q_k - jI_k$ |

10. An apparatus for generating a scrambled signal having real symbols $I_{S,k}$ and imaginary signals $Q_{S,k}$ from a signal having real symbols $I_k$ and imaginary symbols $Q_k$, comprising:
means for generating a real part of a $k^{th}$ element of a complex scrambling sequence ($d_{I,k}$);
generating an imaginary part of the $k^{th}$ element of the complex scrambling sequence ($d_{Q,k}$);
means for generating a scrambling phase multiplier $n_k$ according to:

$n_k = 2d_{I,k} + d_{Q,k}$; and means for generating the scrambled signal:

$$I_{S,k} + jQ_{S,k} = (I_k + jQ_k)e^{j\left(\frac{2\pi n_k}{4}\right)}.$$

* * * * *